(12) United States Patent
Strollo et al.

(10) Patent No.: US 6,980,259 B2
(45) Date of Patent: Dec. 27, 2005

(54) VIDEOCONFERENCING CARREL

(76) Inventors: Giacomo M. Strollo, 2329 Curlew St., Apt. 1, San Diego, CA (US) 92101; Del R. Doty, 3408 Santa Clara Way, Carlsbad, CA (US) 92008

( * ) Notice: Subject to any disclaimer, the term of this patent is extended or adjusted under 35 U.S.C. 154(b) by 680 days.

(21) Appl. No.: 10/247,589

(22) Filed: Sep. 20, 2002

(65) Prior Publication Data

US 2004/0056976 A1   Mar. 25, 2004

(51) Int. Cl.$^7$ .............................. H04N 7/14; E04M 1/14
(52) U.S. Cl. ......................................... 348/836; 52/36.2
(58) Field of Search ............................ 348/836, 838.8, 348/39, 843, 14.08, 14.09; 52/36.2; 235/379

(56) References Cited

U.S. PATENT DOCUMENTS

| | | |
|---|---|---|
| 3,498,011 A | 3/1970 | Lindgren |
| 3,553,911 A | 1/1971 | Morrow et al. |
| 3,845,590 A | 11/1974 | Ertl |
| 3,959,607 A | 5/1976 | Vargo |
| 4,173,024 A | 10/1979 | Miller |
| 4,505,078 A | 3/1985 | Huh |
| 4,594,817 A | 6/1986 | McLaren |
| 4,667,580 A | 5/1987 | Wetzel |
| D294,204 S | 2/1988 | Tombs et all. |
| 4,758,887 A | 7/1988 | Engel et al. |
| 4,845,636 A | 7/1989 | Walker |
| D302,907 S | 8/1989 | Otto et al. |
| 4,902,881 A | 2/1990 | Janku |
| 4,960,117 A | 10/1990 | Moncrief et al. |
| 5,177,912 A | 1/1993 | Ball |
| D338,513 S | 8/1993 | O'Neill |
| D339,251 S | 9/1993 | Gainey |
| D342,517 S | 12/1993 | Bosson |
| 5,289,287 A | 2/1994 | Dargis et al. |
| D346,605 S | 5/1994 | Bosson |
| 5,382,972 A | 1/1995 | Kannes |
| 5,393,964 A | 2/1995 | Hamilton et al. |
| D355,989 S | 3/1995 | Raynor |
| 5,446,515 A | 8/1995 | Wolfe et al. |
| 5,572,005 A * | 11/1996 | Hamilton et al. ........... 235/381 |
| 5,604,341 A * | 2/1997 | Grossi et al. ............... 235/379 |
| 5,615,623 A | 4/1997 | Capraro |
| D379,856 S | 6/1997 | D'Alessio et al. |
| 5,638,646 A | 6/1997 | Shane |
| 5,653,063 A | 8/1997 | Barnett et al. |
| 5,727,353 A | 3/1998 | Getz et al. |
| 5,745,160 A * | 4/1998 | Ishida et al. ............. 348/14.09 |

(Continued)

FOREIGN PATENT DOCUMENTS

WO   WO 02/054314 A1 *   7/2002   ........... G06F 17/60

*Primary Examiner*—Paulos M. Natnael
(74) *Attorney, Agent, or Firm*—McGahey & McGahey APLC; Harry V. McGahey

(57) ABSTRACT

Disclosed herein is a videoconferencing carrel having a one-piece, rotationally molded shell defining an area for containing electronic videoconferencing equipment, having mounting flanges for a transparent screen to protect the electronic components, exit openings to allow wiring for handset attachment and connection to power and networking lines for use as a videoconferencing carrel. A method for manufacturing a one-piece rotationally molded videoconferencing carrel is also provided generally including the steps of providing a mold with a cavity, introducing a polymeric material into the mold cavity, molding the polymeric material into the shape of the videoconferencing carrel, removing the carrel from the mold and placing the molded carrel in a cooling fixture to produce a molded article of manufacture constituting the invention.

4 Claims, 3 Drawing Sheets

U.S. PATENT DOCUMENTS

| | | |
|---|---|---|
| 5,897,325 A | 4/1999 | Koby-Olson |
| 5,953,048 A | 9/1999 | Mikami |
| 5,993,216 A | 11/1999 | Stogner |
| 6,046,761 A | 4/2000 | Echerer |
| 6,205,716 B1 * | 3/2001 | Peltz ......................... 52/36.2 |
| D440,545 S | 4/2001 | Pham et al. |
| 2001/0054019 A1 * | 12/2001 | de Fabrega ................. 705/35 |
| 2002/0130950 A1 * | 9/2002 | James et al. ............ 348/14.08 |

* cited by examiner

VIDEOCONFERENCING CARREL

CROSS REFERENCE

This application is not entitled to the benefit of any prior applications.

This invention relates to a Videoconferencing Carrel and more particularly to a Videoconferencing Carrel especially suitable for use in public areas such as incarceration facilities or airports.

BACKGROUND OF THE INVENTION

As videoconferencing becomes more popular, there is an increasing need for an inexpensive method to make videoconferencing available for public users in high-traffic areas such as incarceration facilities. Some of the difficulties encountered in manufacturing videoconferencing systems for use in such facilities are that the article must be suitable for the use desired as well as being aesthetically pleasing. Suitability for public use requires that the article be durable, easily cleaned, comfortable to use, easily installed, be difficult to tamper with, and have a long life cycle. In addition, public use entails the risks attendant with liquid spills and clean-up problems. The simplest approach would seem to be placing the videoconferencing components upon a table where the user can access them. This is not, however, a suitable combination for public use because of the potential for vandalism and theft of the electronic components comprising the videoconferencing system.

The current art consisting of building cabinets to house and protect the electronic components is fraught with disadvantages. Conventional articles of manufacture for videoconferencing carrels and kiosks are complicated and expensive to manufacture, assemble and produce. The multiple parts, such as screws or other fasteners, may come loose, be subject to vandalism, attempts to dismantle, and present a hazard to children in their vicinity. Liquid spills may run into joints and other areas damaging the electronic components inside.

There is a need for an inexpensive article of manufacture that can be used for public videoconferencing purposes. Accordingly, it is a primary objective of the present invention to accommodate this need.

LIMITATIONS OF PRIOR ART

Currently-available videoconferencing carrels and kiosks generally contain multiple parts which must be manufactured, assembled and fit together making a unit which is expensive to manufacture, and prone to having fasteners loosen, become lost, and is prone to having parts stolen out of it if it is in public use.

Historical attempts to address some or all of the above limitations in modular units are reflected in the following prior art:

D 294204, February 1988, Tombs et al., United States (US) is a design patent for a combined viewing screen, booth and merchandising display for video taped movies or the like.

D 302907, August 1989, Otto et al., United States (US) is a cluster type telephone booth design patent with seats at each of several corners.

D 338513, August 1993, O'Neill, United States (US) is an ornamental video game booth.

D 339251, September 1993, Gainey, Jr., United States (US) is an ornamental design patent for a modular telephone booth.

D 346605, May 1994, Bosson, United States (US) and D 342517, December 1993, Bosson United States (US), are examples of the complicated nature and multiple parts required of previous videoconferencing screen mountings.

D 355989, March 1995, Raynor, United States (US) is an ornamental design for a multiple telephone booth with a dome top. No top is needed and this invention is an article of manufacture.

U.S. Pat. No. 3,498,011, March 1970, Lindgren, United States (US) is a utility room.

U.S. Pat. No. 3,553,911, January 1971, Morrow et al., United States (US) is a booth for the temporary use of travelers, not designed to handle videoconferencing for incarcerated persons or for use at airports and other public places.

D 379856, June 1997, D'Alessio et al., United States (US) shows that prior inventions often had complicated parts and enclosures not desirable for videoconferencing in incarceration or similar public areas.

U.S. Pat. No. 3,845,590, November 1974, Ertl, United States (US), 0520361 is a telephone booth of a multiple part construction allowing privacy on all sides, which is not necessary or desirable with this invention.

U.S. Pat. No. 3,959,607, May 1976, Vargo, United States (US), 379453 is an enclosed telephone booth requiring an access card.

U.S. Pat. No. 4,173,024, October, 1979, Miller, United States (US), 358115 is a unit for watching audio visual productions, but does not lend itself to the visitation function this invention would serve in incarceration facilities or airports as there is no public videoconferencing utility as with this invention.

D 440545, April 2001, Pham et at., United States (US), demonstrates the lack of privacy inherent in most freestanding videoconferencing centers heretofore devised.

U.S. Pat. No. 4,505,078, March 1985, Huh, United States (US) is a bedroom cabinet.

U.S. Pat. No. 4,594,817, June, 1986, McLaren et at., United States (US) are modular sleeping units U.S. Pat. No. 4,667,580, May 1987, Wetzel, United States (US) is a clean room module and would control the environment to an extent not required by the uses to which this invention would be put.

U.S. Pat. No. 4,758,887, July 1988, Engel et al., United States (US) is a videoconferencing table that would not meet the needs for privacy required for videoconferencing with inmates in incarceration facilities.

U.S. Pat. No. 4,845,636, July 1989, Walker, United States (US), 36447907 is a business transaction center.

U.S. Pat. No. 4,902,881, February 1990, Janku, United States (US), 235381 is a complex article of manufacture with faxing etc. facilities not necessary for the videoconferencing for which this invention is designed.

U.S. Pat. No. 4,960,117, October 1990, Moncrief et al., United States (US) is for playing video games. The unit would not be conducive to the uses for which this invention is designed.

U.S. Pat. No. 5,177,912, January 1993, Ball, United States (US) uses a canopy design that would not be useful or desired in the use for which this invention will be used, e.g., for public videoconferencing in incarceration facilities or airports.

U.S. Pat. No. 5,289,287, February 1994, Dargis et al., United States (US) is a projection television system itself, not an article of manufacture for mounting such a system.

U.S. Pat. No. 5,382,972, January 1995, Kannes, United States (US), 348015 is a system designed for courtroom trials that would not be conducive to the need this invention is designed to meet.

U.S. Pat. No. 5,393,964, February 1995, Hamilton et al., United States (US), 235381 is an enclosed telecommunications booth offering many services which would not be useful or economical for the persons who just want to use a simple videoconferencing system whether closed circuit such as in an incarceration facility, or in a high volume public use setting.

U.S. Pat. No. 5,446,515, August 1995, Wolf et al., United State (US) The Wolf Automatic Picture taking machine was not designed for teleconferencing and even if it was so utilized, it consisted of a booth structure which is not as conducive to use in public areas such as incarceration facilities or airports U.S. Pat. No. 5,572,005, November, 1996, Hamilton et al., United States (US), 235381 is a wheeled telecommunications booth whereas portability is not a desired attribute for the public uses envisioned for this invention.

U.S. Pat. No. 5,638,646, June 1997, Shane, United States (US) is an invention to be used as travelers' quarters, whereas the users of this invention would not be using the videoconferencing services for more than a short while.

U.S. Pat. No. 5,615,623, April 1997, Capraro, United States (US), 05203610X is a security system for an automatic teller machine, which would not be necessary for the users of this invention.

U.S. Pat. No. 5,604,341, February 1997, Grossi et al., United States (US), 235379 uses an ATM for a videoconferencing system. This would not be feasible or desirable in an incarceration facility.

U.S. Pat. No. 5,653,063, August 1997, Barnett et al., United States (US), 052029 is a photographic booth for taking photographs of patron. It is not designed for videoconferencing and would not be economically feasible for that purpose.

U.S. Pat. No. 5,727,353, March 1998, Getz et al., United States (US), 0520791 is a portable medical diagnostic suite that would not be economically feasible for just public videoconferencing as performed by this invention.

U.S. Pat. No. 5,745,160, April 1998, Ishida et al., United States (US) demonstrates the complexity inherent in many previous inventions designed for videoconferencing. The invention herein avoids these complexities and is much more suited to the simple requirements of videoconferencing required by incarceration facilities.

U.S. Pat. No. 5,897,325, April 1999, Koby-Olsen, United States (US), 434432 is a learning mechanism cubicle that would not be economically feasible for the high volume of public use in incarceration facilities or airports.

U.S. Pat. No. 5,953,048, September, 1999, Mikami, United States (US), is an example of a video telephone housing showing the lack of privacy allowed by the current invention, as well as the susceptibility to vandalism and theft which previous designs were subject to.

U.S. Pat. No. 5,993,216, November 1999, Stogner, United States (US), 434029 is designed to be a quiet, enclosed work place for students and business people. It is not designed for high volume traffic such as this invention.

U.S. Pat. No. 6,046,761, April 2000, Echerer, United States (US), 348013 is a system for examining a patient remotely by a Doctor. The system is designed for privacy primarily and requires identification cards for the participants. The invention here is one that is specifically designed for use by the public and any party on the receiving end, whether an incarceration facility, or another private or public video-conferencing participant.

U.S. Pat. No. 6,205,716, Mar. 27, 2001, Peltz, United States (US) is a patent for a modular enclosure, stressing privacy. This invention is designed for areas where absolute privacy is not necessary or desired.

SUMMARY OF THE INVENTION

The invention consists of a one-piece rotationally molded videoconferencing carrel comprising a base, two side walls, a protective viewing screen, a shelf in front and optional wiring covers in the back. The principal and secondary objects of this invention are to provide a totally new type of videoconferencing carrel that is inexpensive to manufacture, is durable, is liquid resistant, corrosion free, lacks complex parts, does not require complicated assembly, can be shaped into a stylish form, is easily cleaned, and which ensures greater privacy, easy wiring and hook up, concealment of wiring and electronic components, and protection of internal components from tampering, theft and vandalism. The present invention is an article of manufacture that utilizes a rotational molding technique to create its form. Such a form has very few parts that need to be assembled, it has few fasteners or connectors to be lost, become loose, or be stolen, and it can be joined in series with additional units to create a videoconferencing system of kiosks or carrels for use in public areas such as prisons, airports, etc.

In addition, the resulting hollow panels provide superior absorption and privacy between occupants of adjacent carrels.

DETAILED DESCRIPTION

Figure 1:
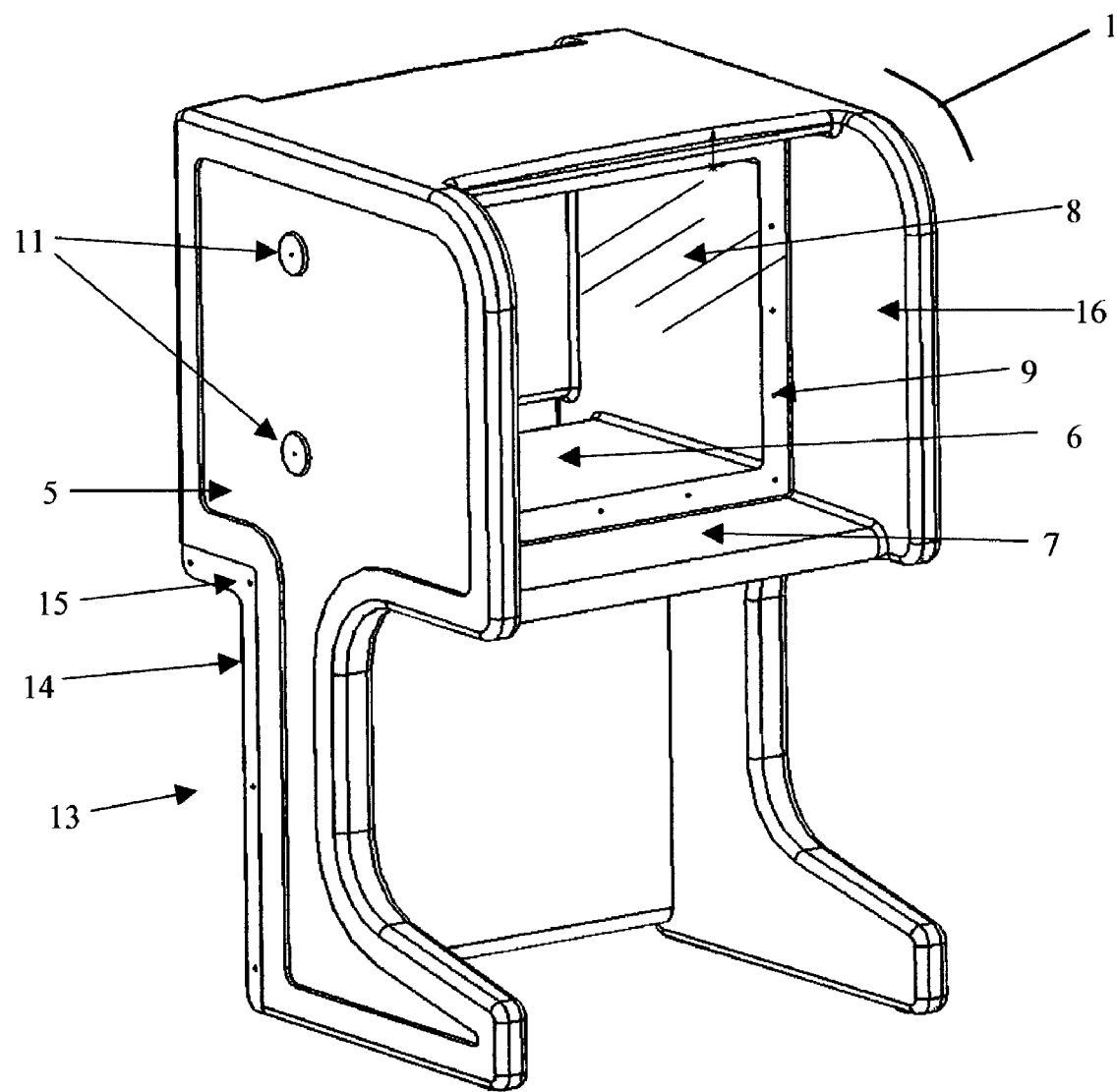
FIG. 1 illustrates a front, top and left-side perspective view of the videoconferencing carrel embodying various features of the invention.
Figure 2:
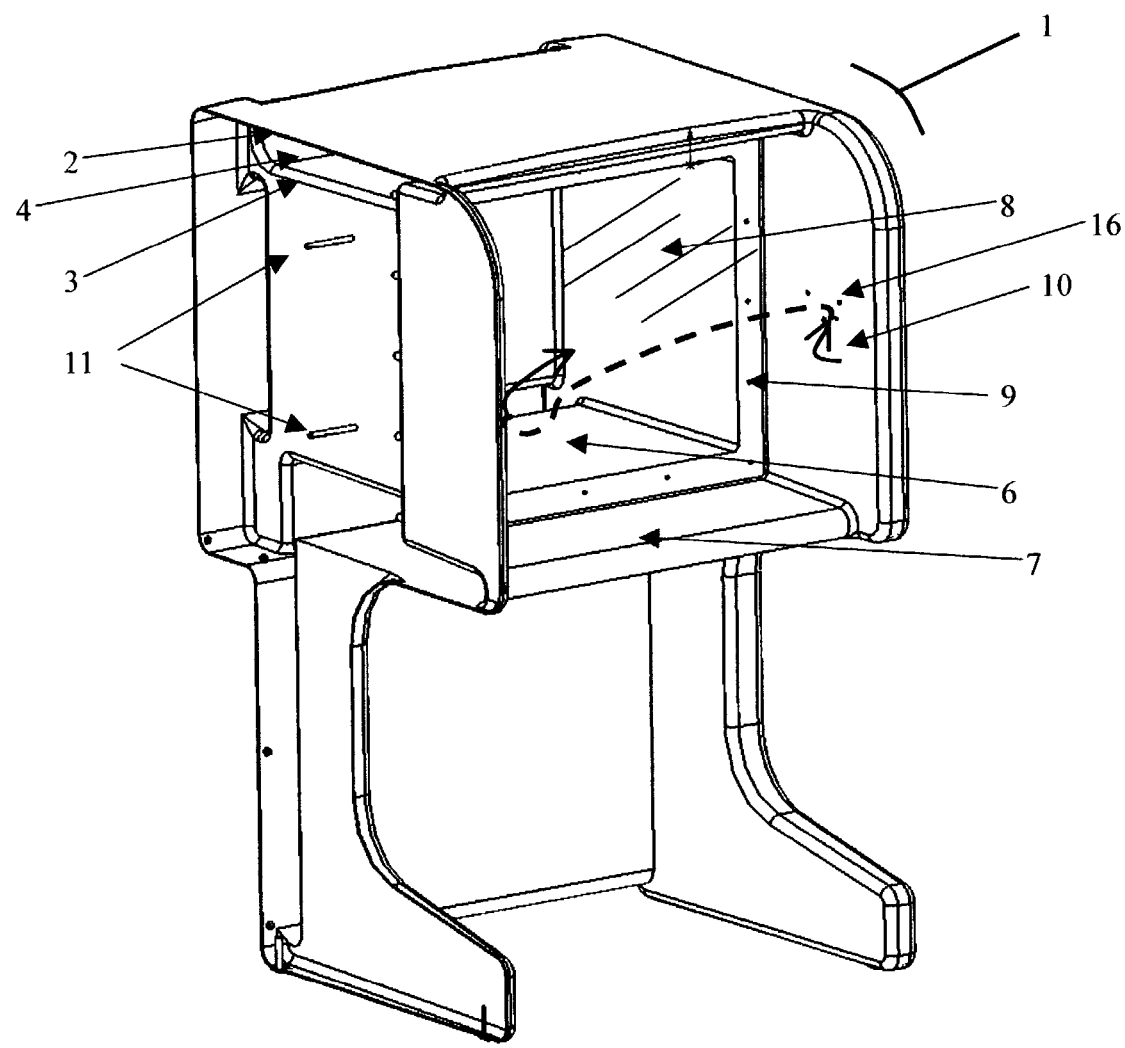
FIG. 2 illustrates a front, top and left-side perspective view thereof with the left side cut away showing the shallow chambers in between the exterior and interior surfaces.
Figure 3:
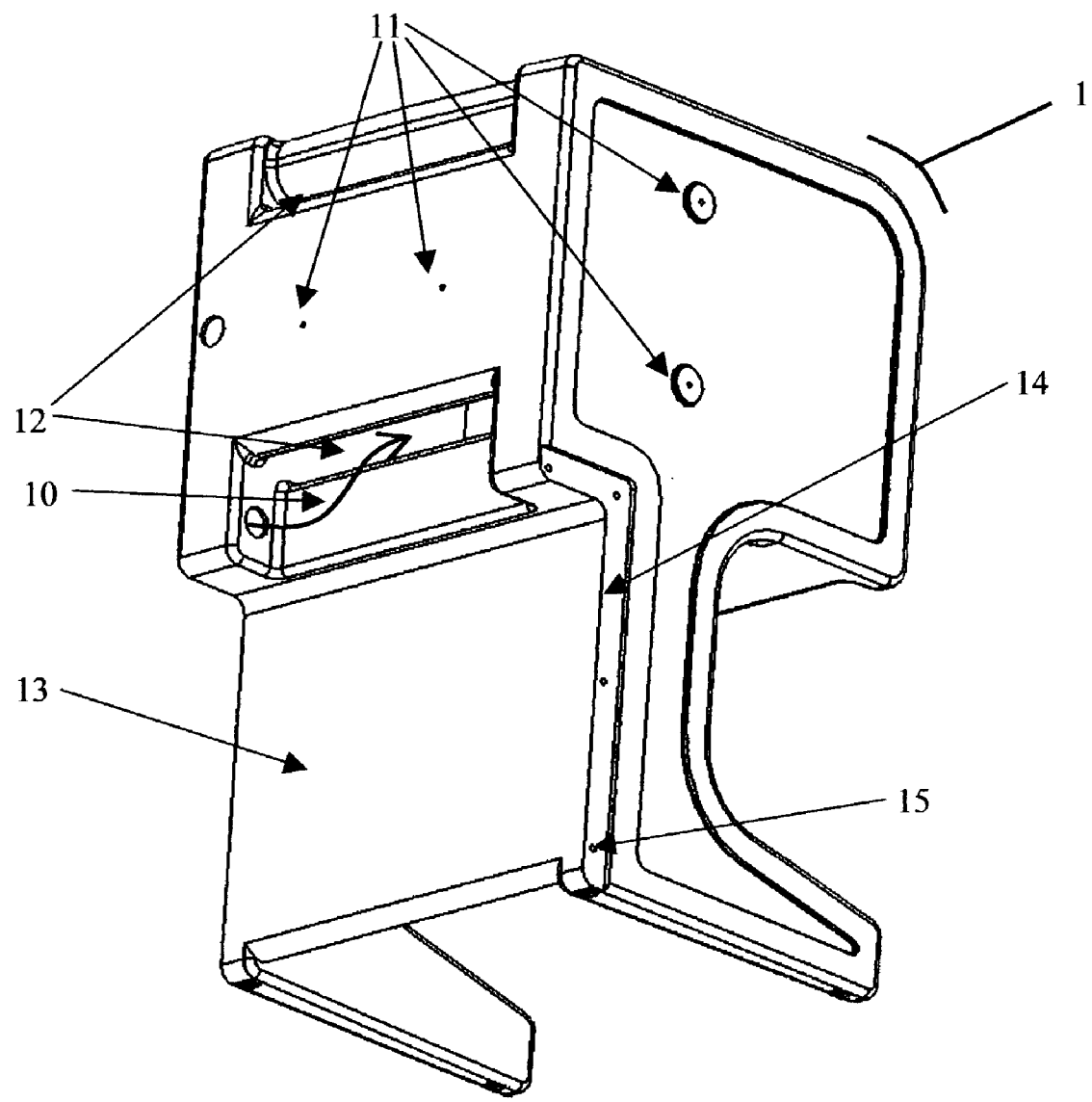
FIG. 3 illustrates a left side, rear and bottom perspective thereof

Referring to the drawings, there is shown a one-piece videoconferencing carrel 1 of a uni-body type of construction made by a rotational molding process out of a thermoplastic material, preferably a polyethylene-based polymer specifically formulated for even shrinkage, high fracture toughness, and high creep resistance.

Although its size can vary, a typical convenient size for use by adults would be 32" wide×32" deep×54" high.

The structure comprises an outside wall 2 and an inside wall 3 of plastic joined around their periphery and defining therebetween a shallow chamber 4. The one-piece, rotationally molded carrel body, indicated generally as 1, also acts as a double-walled shell 5 for the videoconferencing electronic components and attendant wiring which sit upon interior shelf 6.

There is a desk surface 7 and a protective transparent screen 8 mounted with a plurality of threaded inserts 9 to enclose the videoconferencing electronic components and wiring. A handset wiring path 10 runs where convenient through the double-walled shallow chamber 4. Mounting holes 11 on the side wall and rear wall of the unit facilitate the anchorage of the unit to adjacent units or to a facility wall.

Openings 12 for ventilation and heat dissipation are placed on the back of the unit, where they are not accessible by unauthorized persons.

There is an area for a wireway 13 on the back of the unit to conceal cables connecting the unit to utility lines, electrical power and networking cables. On standalone or end units in a series, this area is covered by a wireway mounting cover that mates with a recessed area 14 and is secured by an anchoring means 15 such as screws or bolts, preferably tamper-resistant.

On the interior wall of the right side of the unit, above the desk surface 7, there are threaded inserts 16 for mounting a videoconferencing telephone handset to the unit. It should be understood that any type or style of videoconferencing system can be utilized for the electronic components to be installed inside the invention for the purpose of using it for videoconferencing.

The plastic shell 1, which constitutes the main structure of the videoconferencing carrel, is preferably made by a rotational molding process. This type of molding process is well-known in the art and is particularly adapted to produce small or large parts and products of unusual shape which require thin walls but increasing thickness on outside corners for increased strength. Although rotational molding is conventional, it is believed that no one has produced a videoconferencing carrel in this manner.

The creation of invention 1 by way of rotational molding is as follows: A mold of the video conferencing carrel is created and the mold is partially assembled on the offset arm of the rotational molding machine. The inside surface of the mold corresponds to the external outline of the molded part. Threaded inserts designed for insert molding are placed in locations where high fastener retention strength must be maintained, that is, at locations on the bottom of the mold that correspond to where the leveling feet or casters will be installed on the molded part. Approximately eighty pounds of a polyethylene rotational molding resin is poured into the mold. At least one vent tube, preferably two, made of "non-stick" material, such as polytetrafluoroethylene (PTFE), are inserted through openings in the mold to allow the interior of the mold and the molded part to remain at atmospheric pressure throughout the molding and cooling process.

The remainder of the mold is then assembled. The mold is then rotated about two perpendicular axes at a sufficiently slow rate of speed so that the polyethylene powder falls to the bottom-most portion of the mold by way of gravity. The mold is then transferred into a furnace where it is subjected to sufficient heat to melt the thermoplastic material. The two-axis rotation provides a means to spread the melted thermo-plastic into a layer of substantially even thickness against the entire internal surface of the mold. It remains in the furnace until sufficient time has passed to allow the resin to spread evenly and create a semi-uniform wall thickness.

The mold is pulled from the oven and is allowed to rotate and cool in the open air. The mold is then moved into a cooling chamber where it continues to rotate while a combination of water spray and forced air convection is used to cool it. The mold is removed from the cooling chamber when sufficient time has passed to allow part removal without distortion. The mold is subsequently opened and the molded part is retrieved. Regulated air pressure is supplied to the interior of the part to keep the side walls and top from drawing in during cooling. The legs of the carrel are held apart at a fixed distance to compensate for warpage during the cooling process. After the carrel has cooled, the mold parting-line flash is removed and any small voids are repaired. Drill fixtures may then be used to create holes for threaded inserts where high tolerance may be desired for mating components. Holes must also be drilled for wiring access. Typically, mating components would include the protective screen, the phone handset mounting plate, and the wireway covers. Rivet-style nuts are then installed in the hole locations created with the drill fixtures. Access holes for the phone handset wires must also be created in the rear of the unit to facilitate installation and to provide an exit point for the wires.

This economical process produces a seamless, strong, one-piece hollow carrel having a uniform wall thickness. This method of production of a videoconferencing carrel is considered novel because it provides the benefits detailed above.

The invention 1 is lightweight yet very durable and strong. The invention is very aesthetically pleasing and can be manufactured in several different colors. Moreover, the invention can be easily arranged in rows or series to allow a large number of the public to use the carrels in a relatively small area.

While the preferred embodiments of the invention have been described, modifications can be made and other embodiments may be devised without departing from the spirit of the invention and the scope of the appended claims.

I claim:

1. A method of manufacturing one-piece rotationally molded videoconferencing carrel comprising:
   a. a structure having a peripheral edge and being shaped and dimensioned to support videoconferencing equipment above a surface, said structure comprising a shelled cavity made of an external plastic wall and an internal plastic wall joined along said peripheral edge and defining therebetween a series of shallow chambers resulting in a pair of oppositely placed hollow side panels adjoining a hollow horizontal shelf/writing desk surface;
   b. an interior shelf for placing videoconferencing components thereon;
   c. a continuous path for electronic component wiring along the rear of the unit in a space physically separated from the carrel occupant;
   d. a plurality of open wiring paths for electronic component communication wires to have access to any internal chamber cavity of the structure;
   e. an exit point for videoconferencing equipment wiring to exit said unit;
   f. a plurality of protective screen mounting flanges for securing a protective transparent screen in the front of the unit for viewing a television screen or video monitor;
   g. a recessed area behind the protective screen mounting flanges to house the video or television monitor and its associated electronic components.

2. The videoconferencing carrel according to claim 1, wherein there is a wireway mounting cover at the rear of the structure to cover the wiring exiting from the unit in the back, secured by a plurality of fastening means.

3. The videoconferencing carrel according to claim 1, wherein there is installed thereon a protective screen of a transparent material by a plurality of fastening means to the protective screen mounting flanges on the structure, such that a television screen or video monitor installed behind the protective screen is protected from access by a person viewing said television screen or monitor.

4. The videoconferencing carrel according to claim 1, wherein said structure is manufactured by a rotational molding process comprising:

a. forming a mold having internal surfaces defining the external and surfaces of said carrel;

b. partially assembling the mold on the offset arm of a rotational molding machine;

c. placing molded-in threaded inserts for the feet or casters to be installed later on the bottom of the carrel;

d. depositing into said mold a volume of thermoplastic material;

e. inserting at least one vent tube of a "non-stick" material through openings in the mold to allow the interior of the mold to remain at atmospheric pressure throughout the molding process;

f. closing said mold;

g. rotating said mold about two perpendicular axis at a slow rate of speed such that the thermoplastic material falls to the bottom-most portion of the mold by way of gravity;

h. exposing said mold to a temperature high enough to melt the thermoplastic material;

i. rotating said mold about two perpendicular axes at speeds and for periods sufficient to gravitationally spread said plastic powder against said internal surface of the mold where it subsequently melts and builds up an even thickness;

j. cooling said mold to a temperature and for a period sufficient to phase transition said material to a hardened state while applying air pressure to the interior of the mold so that the sidewalls and top do not draw in during cooling; and k. opening said mold to retrieve said structure.

* * * * *